United States Patent [19]

MacDavid

[11] 4,270,208

[45] May 26, 1981

[54] THRESHOLD GENERATOR

[75] Inventor: Kenneth R. MacDavid, Fairport, N.Y.

[73] Assignee: Harris Corporation, Melbourne, Fla.

[21] Appl. No.: 26,050

[22] Filed: Apr. 2, 1979

[51] Int. Cl.³ .......................................... H04L 25/06
[52] U.S. Cl. ..................................... 375/76; 328/163; 364/111
[58] Field of Search ............... 178/66 R, 88; 325/320, 325/321, 322, 323, 324, 325, 326; 364/111, 112, 571, 830, 833; 328/146, 151, 162, 163, 164, 165, 166, 167; 329/136, 178; 375/76, 95, 99, 102, 88, 78

[56] References Cited

U.S. PATENT DOCUMENTS

| | | | |
|---|---|---|---|
| 3,372,234 | 3/1968 | Bowsher et al. | 178/88 |
| 3,473,131 | 10/1969 | Perkins, Jr. | 328/163 |
| 3,509,279 | 4/1970 | Martin et al. | 178/88 |
| 3,569,785 | 3/1971 | Durbeck | 364/111 |
| 3,628,003 | 12/1971 | Spence | 364/833 |
| 3,716,780 | 2/1973 | Vanelk et al. | 325/324 |

*Primary Examiner*—Benedict V. Safourek
*Attorney, Agent, or Firm*—L. Lawton Rogers, III

[57] ABSTRACT

A threshold generator for an FSK demodulator compensates for selective fading of the FSK signal. The peak positive and negative amplitude excursions in a composite envelope signal, representative of detected mark and space tone signals, are sampled and respectively stored in two sample and hold circuits. The average value of the amplitude values stored in the sample and hold circuits is computed to establish a threshold signal. When no transitions occur in a demodulated data signal for a predetermined period of time due to the absence of incoming information, the composite envelope signal is conducted to ground, thereby forcing the output signals of the sample and hold circuits to go to zero volts. The sample and hold circuits continuously sample the grounded signal to maintain the threshold level at zero volts as long as no transitions occur in the demodulated data signal.

16 Claims, 4 Drawing Figures

THRESHOLD GENERATOR

BACKGROUND OF THE INVENTION

The present invention relates to a method and apparatus for producing a variable threshold level. More particularly, it relates to a variable level threshold generator for establishing the decision threshold level of a composite envelope signal detector in a frequency shift keyed (FSK) demodulator.

In frequency shift keyed signal communication, a binary signal is transmitted by selectively modulating a carrier signal at one of two designated frequencies. The two resulting tone signals produced by modulation with the two frequencies are commonly denoted as "mark" and "space" signals. In a receiver responsive to FSK signals, a demodulator is utilized to determine whether a mark or space signal is being received. The demodulator includes circuitry for converting the received signal into a signal having a predetermined voltage level which is dependent upon the frequency and amplitude of the received signal. This signal is fed to a decision circuit which determines which one of the two anticipated tone signals has been received. Conventionally, the voltage signals for the mark and space tone signals are combined to form a composite envelope signal in which the mark tone is designated by a signal level of a first polarity, and a space tone is designated by a signal level of the opposite polarity. The decision circuit detects the polarity of the incoming signal relative to a threshold value, and produces an output signal indicative of the detected polarity.

Under ideal conditions, the absolute values of the amplitudes of the mark and space tone signals are equal. Therefore, the threshold value utilized by the decision circuit is set to be zero volts, since it is midway between the negative and positive peak amplitude excursions of the composite envelope signal. Due to signal attenuation, however, the amplitude of the two tone signals will not always be the same. This phenomenon, known as selective fading, occurs when one of the mark and tone signals is attenuated more than the other during signal transmission. When this selective fading occurs, it is desirable to maintain the threshold level midway between the peak positive and negative amplitude values of the composite signal, i.e., at the average value of the mark and space tone signals. However, when no data signal is being received, or when one tone signal is transmitted for a relatively long period of time, it is desirable to set the threshold level to be at the statistically most probable value, i.e., zero volts.

One proposed solution for providing a threshold value in an FSK receiver is set forth in U.S. Pat. No. 2,999,925, issued to Thomas. In the threshold computer of the Thomas patent, the negative and positive portions of the composite envelope signal are separated and the two resulting wave forms are capacitively coupled to D.C. restorers of opposite polarities. The D.C. restored wave forms are peak detected utilizing RC networks having predetermined decay rates. The output signals of the two detectors are resistor summed to form the required threshold signal.

One problem associated with threshold computers of the type which utilize RC circuits, such as that disclosed in the Thomas patent, is the dependence of the threshold signal upon the data content, i.e., mark to space signal ratio of the received FSK signal. For example, if a plurality of mark tone signals are consecutively received, i.e., uninterrupted by space tone signals, the RC circuits will begin to discharge the energy stored therein and the threshold signal will decay towards zero volts. If the decay rate of the RC circuits is decreased so that the threshold signal does not decay towards zero as rapidly, the responsiveness of the threshold computer to changes in the peak amplitudes of the composite envelope signal will be correspondingly decreased. Consequently, a compromise must be reached between the decay rate of the threshold signal and the response rate of the computer, since these two rates cannot be independently adjusted.

OBJECTS OF THE INVENTION

It is therefore an object of the present invention to provide a method and apparatus for generating a threshold signal which is responsive to changes in the peak amplitudes of an information signal.

It is another object of the present invention to provide a method and apparatus for generating a threshold signal which automatically compensates for selective fading in a received FSK signal.

It is a further object of the present invention to provide a novel method and apparatus for generating a threshold signal which rapidly forces the threshold signal to the statistically most probable level in the absence of a received data signal.

It is yet another object of the present invention to provide a novel method and apparatus for generating a threshold signal which is independent of the data content of a received information signal.

It is yet a further object of the present invention to provide a novel method and apparatus for generating a threshold signal in which the various timing factors in the signal generation process can be independently fixed.

It is still another object of the present invention to provide a novel FSK demodulator including a threshold signal generator which possesses the features noted above.

These and other objects and advantages of the present invention will become apparent to one skilled in the art from the claims and from a perusal of the following detailed description when read in conjunction with the attached drawings.

DETAILED DESCRIPTION

The present invention relates to a signal generator for producing a reference signal in dependence upon a received command or information signal. In its preferred embodiment, the present invention is utilized to produce a threshold signal for a decision circuit in an FSK demodulator. It will be apparent, however, that the invention is not limited to such an environment and that it can be utilized wherever a reference signal is to be produced in dependence upon a select parameter of a command or information signal.

Figure 1:
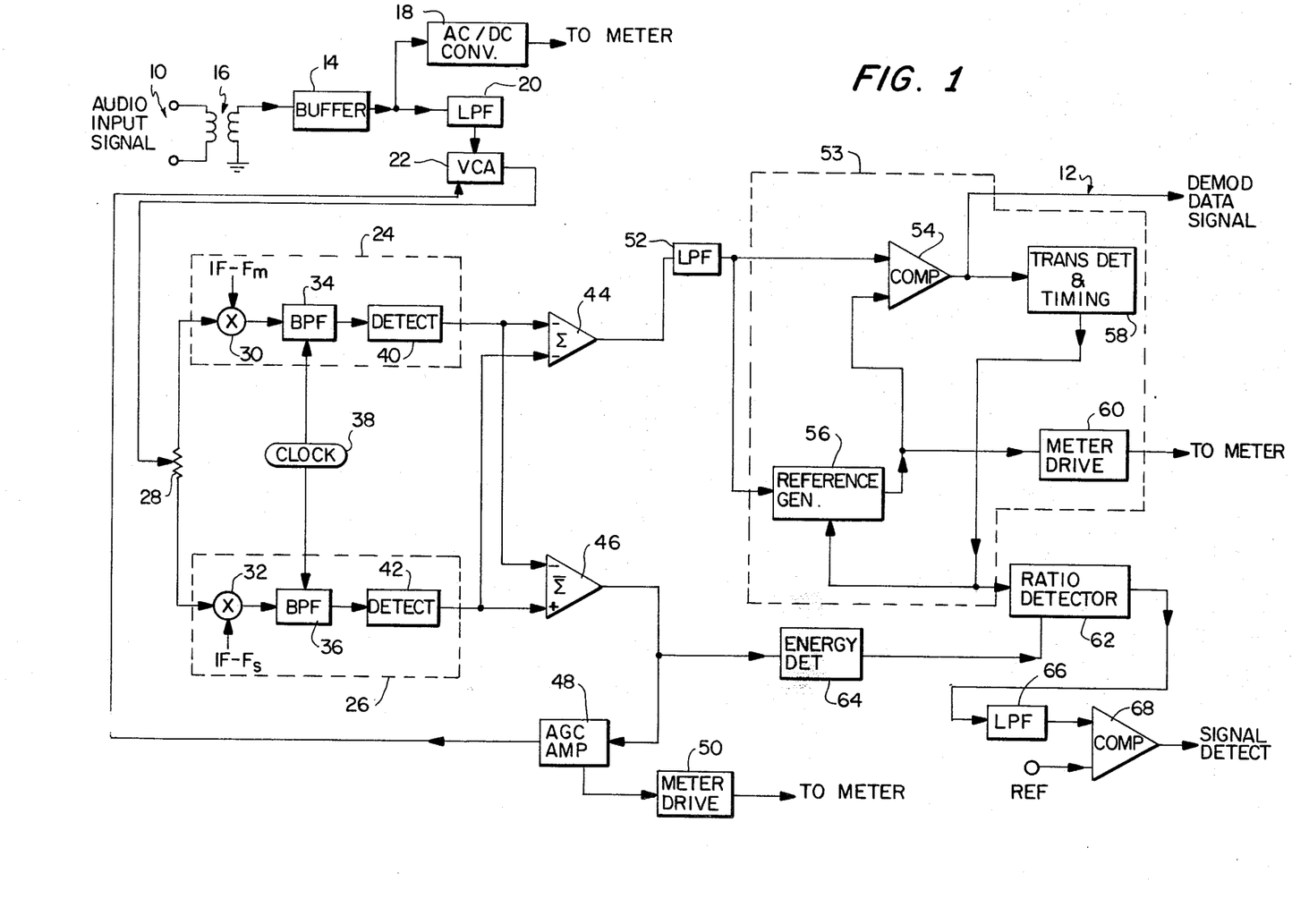
FIG. 1 is a block diagram of an FSK demodulator including the novel threshold generator of the present invention.

A conventional FSK demodulator containing the novel threshold generator of the present invention can be included in a radiotelegraph two-tone FSK modem (not shown), for example. Such a demodulator is illustrated in FIG. 1. The demodulator includes an input terminal 10 which can receive an audio input signal encoded in frequency shift keyed format. The received mark and space tone signals can be in the frequency range of 270–3400 Hz and have a baud rate of 50–150 bits of information per second in the illustrated embodiment. The demodulator produces a binary encoded demodulated data signal at an output terminal 12, which signal indicates whether a mark or space tone signal has been received at the input terminal 10.

The FSK audio input signal is coupled to an impedance matching buffer 14 by means of a transformer 16. The output signal from the buffer is passed to an A.C. to D.C. converter 18. The D.C. output signal from the converter 18 is fed to a meter (not shown) which indicates the signal strength of the received input signal.

The output signal from the impedance matching buffer 14 is also fed to a low pass filter 20 which passes only those signals in the frequency range of the anticipated mark and space tone signals. The output signal from the low pass filter 20 is presented to a voltage controlled amplifier 22, which is suitably controlled by means of a feedback loop to provide a relatively constant amplitude input signal to a pair of A.C. demodulators 24, 26. The output signal from the amplifier 22 is fed to the demodulators by means of a balancing resistor 28. The balancing resistor 28 is a variable resistor which is adjusted so that the input signals to the respective A.C. demodulators 24, 26 have approximately the same amplitude under ideal conditions, i.e., when no selective fading occurs.

Each of the A.C. demodulators 24, 26 includes a signal mixer 30, 32 which receives the output signal from the voltage controlled amplifier 22 after it has been amplitude adjusted by the balancing resistor 28. The input signals to the demodulators 24, 26 are combined with preselected reference signals in the mixers 30, 32. The reference signal for each of the mixers 30, 32 has a frequency equal to a predetermined intermediate frequency IF, e.g., 8,000 Hz, minus the frequency of the tone signal to which the demodulator is responsive. Thus, the reference signal for the mixer 30 of the mark signal demodulator has a frequency equal to $IF-F_M$, where $F_M$ equals the frequency of the mark tone signal. Likewise, the reference signal for the mixer 32 of the space signal demodulator 26 is equal to $IF-F_S$, where $F_S$ is equal to the frequency of the space tone signal. From this arrangement it will be apparent that the mixer 30 of the mark signal demodulator 24 will produce an output signal at the intermediate frequency IF when a mark tone signal is received and the mixer 32 of the space signal demodulator 26 will produce an output signal at the intermediate frequency IF when a space tone signal is received.

The output signals from the mixers 30, 32 are respectively fed to a pair of band pass filters 34, 36. Due to the fact that the mixers 30, 32 produce an output signal at the intermediate frequency IF when a mark or space tone signal is received, respectively, each of the band pass filters 34, 36 can be substantially identical, having a center frequency equal to the intermediate frequency IF and a relatively narrow bandwidth. This arrangement is preferable to demodulator circuits having band pass filters which are respectively responsive to the mark and space signal frequencies, and therefore require individual calibration. The band pass filters 34, 36 can be commutative filters having center frequencies which are controlled by means of a clock 38 synchronized to the predetermined intermediate frequency IF, e.g., 8,000 Hz.

When a signal at the intermediate frequency IF is presented to one of the band pass filters 34, 36 by the mixers 30, 32, the band pass filter will produce an output signal having a relatively high amplitude level. The output signals from the band pass filters 34, 36 are presented to a pair of detectors 40, 42, respectively. The detectors 40, 42 determine when a high level signal is produced by the band pass filter associated therewith, and provide an output signal indicative of this fact. The detectors 40, 42 are identical except for internal circuit elements, such as diodes for example, which are reversed relative to one another. This difference in circuit arrangements causes the output signal from one of the detectors, the mark tone detector 40 for example, to be negative with respect to ground while the output signal from the other detector is positive with respect to ground.

The output signals from the detectors 40, 42 are combined in a pair of summation amplifiers 44, 46. Both of the detectors 40, 42 are connected to inverting input terminals of the summation amplifier 44, which is connected as a summing amplifier. The summation amplifier 44 provides a composite envelope output signal in which detected mark tone signals are represented by a signal having an amplitude level of a first polarity, e.g., positive, and detected space tone signals are represented by a signal having an amplitude level of the opposite polarity.

The mark tone detector 40 is connected to the inverting input terminal of the amplifier 46 and the space tone detector 42 is connected to the non-inverting input terminal of the amplifier 46, which is connected as a difference amplifier. The output signal from the amplifier 46 is a relatively constant positive signal having an amplitude which indicates the energy level of the received audio input signal.

This output signal from the amplifier 46 is fed to an automatic gain control (AGC) amplifier 48. The AGC amplifier 48 compares the energy level of the output signal from the summation amplifier 46 with a predetermined reference value. An output signal indicative of the results of this comparison is fed to the control input terminal of the voltage controlled amplifier 22, to automatically adjust the amplitude of the input signal to the mark and space tone signal demodulators 24, 26. The output signal from the AGC amplifier 48 can also be fed to a meter drive circuit 50 which controls a meter (not shown) to indicate the automatic gain control voltage level.

The composite envelope signal produced by the summation amplifier 44 is passed through a low pass filter 52, to suppress high frequency noise. The output signal from the low pass filter 52 passes to a decision circuit 53 which embodies the present invention. The decision circuit 53 determines whether a mark or space tone signal has been received.

In the decision circuit 53, the composite envelope signal is presented to one input terminal of a mark vs. space comparator 54. A threshold signal is provided to the other input terminal of the comparator 54 by a reference generator 56. The comparator 54 compares the amplitude of the composite envelope signal with the threshold signal to determine whether a mark or space tone signal has been received and detected. The comparator 54 produces a binary, serial, asynchronized data signal indicative of the information contained in the received FSK audio signal. This demodulated signal is processed by other receiver circuitry (not shown) to determine the data content of the received signal.

The output signal from the comparator 54 is also presented to a transition detection and timing circuit 58. The transition detection and timing circuit 58 detects transitions in the demodulated data output signal between the two binary levels and provides control and timing pulses to the reference generator 56, to control the production of the threshold signal by the generator 56.

The threshold signal produced by the reference generator 56 can be provided to a meter drive circuit 60 as well as the comparator 54. The meter drive circuit 60 controls a meter (not shown) which indicates the amplitude and polarity of the reference signal. The indication provided by the meter can be used as an aid in tuning the receiver to an incoming signal. Failure of the meter to remain on a central reference point or to evenly oscillate about the reference point indicates that the incoming signal is misaligned with tone signals anticipated by the demodulator. The indication provided by the threshold level meter can also be used as an aid in adjusting the setting of the balancing resistor 28.

The transition detection output pulses from the transition and timing circuit 58 can be fed to one input terminal of a ratio detector circuit 62, to provide an indication of the time interval between successive transitions of the demodulated data signal. An energy detection circuit 64 detects the energy level of the output signal from the summation amplifier 46 and provides binary output signal indicative of whether the average energy of the FSK input audio signal is above or below a predetermined level. For example, the energy detection circuit 64 may be an integrator and comparator which provides an output signal at a first binary state (low) when the energy level of the output signal from the summation amplifier 46 is above a fixed reference value, and an output signal at a second binary state (high) when the output signal from the summation amplifier 46 has an energy level which is below the fixed reference value. The output signal from the energy detection circuit 64 is provided to an enabling input terminal of the ratio detector circuit 62.

When the output signal from the energy detection circuit is in its first binary state, e.g. low, the ratio detector circuit 62 is initialized and enabled to examine the output pulses from the transition detection and timing circuit 58 over contiguous sampling periods. Each sampling period may be 128 milliseconds long, for example. The ratio detector circuit 62 determines a ratio count indicative of the number of sampling periods over a total number of fixed sampling periods in which two or more consecutive transitions in the demodulated data signal occurred within a minimum time interval of each other. The number of fixed sampling periods can be 8 and the minimum time interval can be 2 milliseconds, for example. Thus, the ratio count indicates the frequency of occurrence of transitions in the demodulated data signal which are spaced too close to one another.

The ratio count determined by the ratio detector circuit 62 is internally compared with a predetermined number. When the ratio count is less than the predetermined number, the output signal from the ratio detector 62 will be in a first binary state, e.g. high, to indicate that a preliminary decision has been made that a valid, information carry FSK audio input signal is being received. If the ratio count is greater than the predetermined number, the output signal from the ratio detector 62 will assume a second level, e.g. low, thereby indicating a preliminary decision that a valid FSK audio input signal is not being received. The output signal from the ratio detector 62 will also be at its second level when the output signal from the energy detector 60 is in its second binary state, e.g. high.

The output signal from the ratio detector 62 is passed through a low pass integrator filter 66 to one input terminal of a comparator 68. The comparator 68 compares the integrated output signal from the ratio detector with a predetermined reference signal.

If the time interval between successive transitions of the demodulated data signal, as indicated by the time interval between successive pulses from the transition and timing circuit 58, is generally greater than the minimum time interval and if the FSK input audio signal is of a sufficiently high energy level, the comparator 68 will provide a high level output signal indicating that a valid incoming information signal has been detected. However, if a significant number of the time intervals between successive transitions in the data signal are less than the minimum time interval, or if the FSK audio input signal level is not of a sufficiently high energy level, the comparator 68 will provide a low level output signal to indicate that only spurious noise is being detected. The ratio detector circuit 62 and comparator 68 thus function to statistically process the demodulated data and provide an output signal when an incoming information signal has been detected. This output signal from the comparator 68 can be utilized to actuate other receiver circuitry (not shown).

Figure 2:
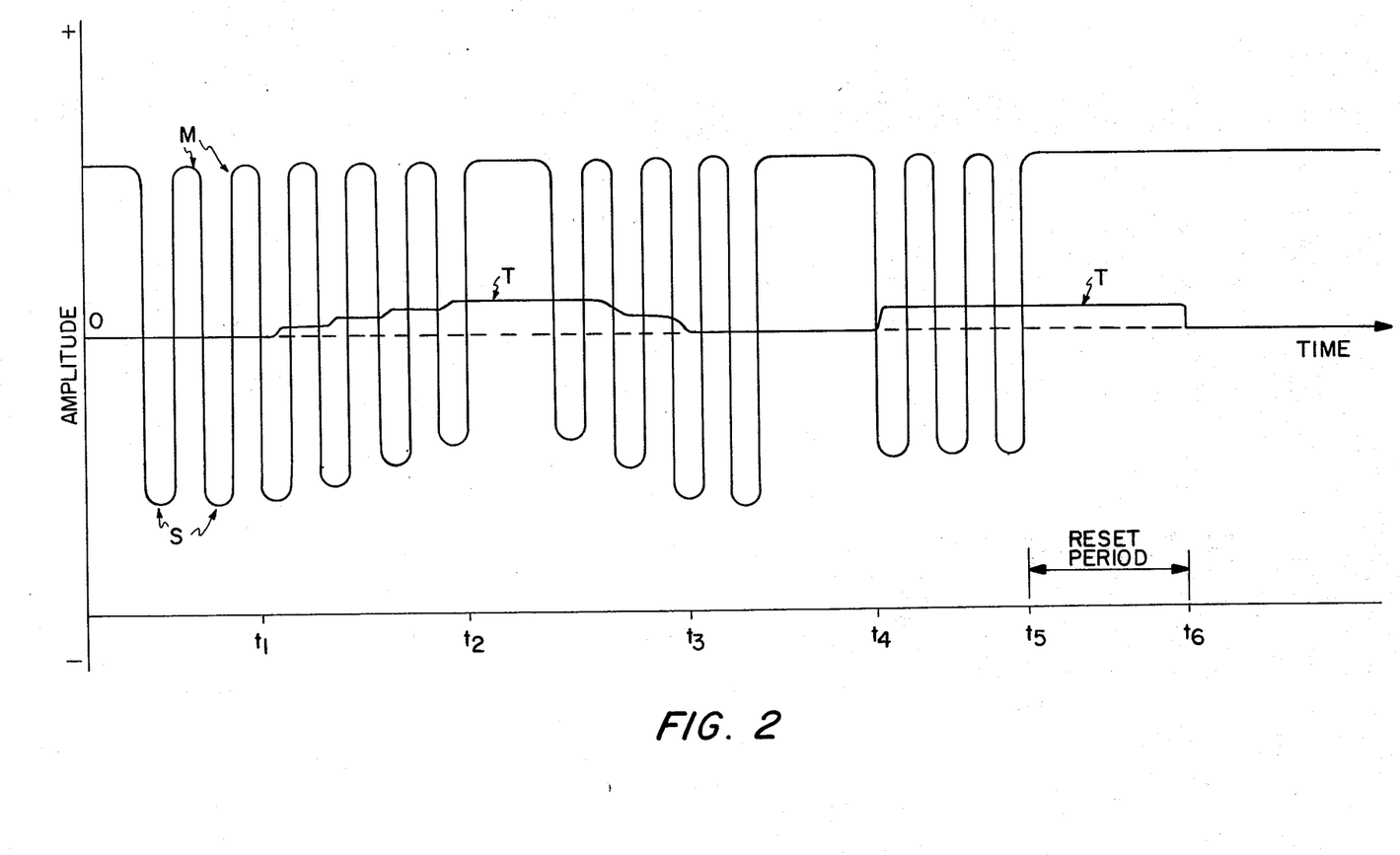
FIG. 2 is a timing diagram of an FSK signal illustrating selective fading of the signal and the generation of a threshold signal in accordance with the present invention.

A timing signal diagram illustrating the composite envelope signal and the desired threshold reference signal is shown in FIG. 2. The mark tone signals M are indicated by the composite envelope peaks having a positive polarity, and the space tone signals S are indicated by the composite peak signals having a negative polarity. The best threshold value is located midway between the peak amplitude excursions of the composite envelope signal. Where the absolute values of the amplitudes of the mark and space tone signals are equal, the best reference signal is equal to zero volts. However, when selective fading of the frequency shift keyed signal occurs, the best reference signal remains midway between the peak excursions of the composite envelope signal but is no longer zero volts. Selective fading of the space tone signal is illustrated in FIG. 2 during the time period from $t_1$ to $t_3$. As can be seen in the Figure, the absolute value of the space tone signals, i.e., peak deviation of the signal from zero volts, is less than that of the mark tone signals. During this time period, the desired threshold signal is no longer zero volts, but rather has a positive value.

In prior art threshold signal generators, such as the type disclosed in the previously discussed Thomas patent, the generation of the threshold signal was dependent on the data content of the received information signal. For example, if a series of mark tone signals were consecutively transmitted, as shown beginning with time $t_2$ in FIG. 2, the threshold signal T would begin to decay towards zero volts. This decay of the threshold signal would continue until the next attenuated space tone signal is detected. However, in accordance with the present invention, the threshold signal T remains at the desired voltage level until the amount of attenuation of the space tone signal changes or a predetermined, independently adjustable time period has lapsed. Hence, in accordance with the present invention, the threshold signal T does not return to a value of zero volts until the absolute value of the space tone signal is equal to that of the mark tone signal, as shown at time $t_3$ in FIG. 2.

When no information signal is received for a substantial period of time, the threshold signal should be set at the statistically most probable reference level, i.e., zero volts. In FSK signalling, the absence of an information signal is indicated by the continuous transmission of the mark or space tone signal. In FIG. 2, the absence of information is represented as the continuous transmission of a mark signal. After the continuous transmission of a series of mark tone signals, an attenuated space tone signal is received at time $t_4$. Since only the space tone signal, rather than both of the tone signals is attenuated, selective fading of the incoming information is occurring. Therefore, the threshold signal T is adjusted correspondingly at time $t_4$. The subsequent space tone signals remain attenuated, and therefore the threshold signal T is maintained at its positive level. At time $t_5$ the transmission of the data has ended and a continuous mark tone signal is transmitted. After a predetermined time period, the threshold signal T is reset at time $t_6$ to be at zero volts. In this manner the threshold signal is set to be at the statistically most probable reference level when the transmission of the next piece of data occurs.

Figure 3:
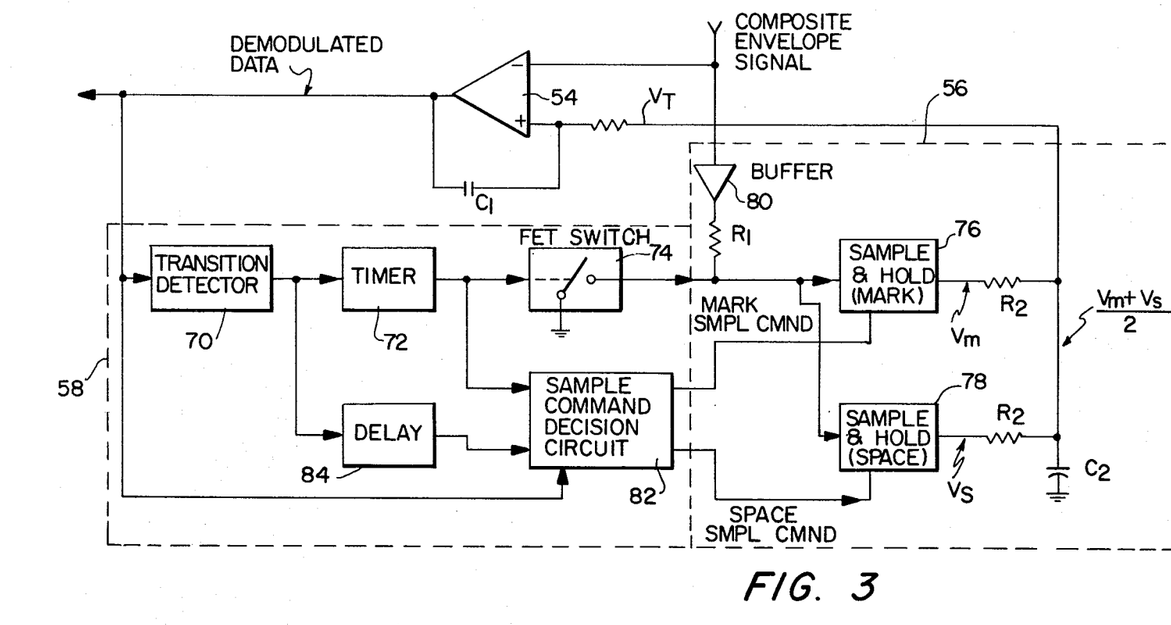
FIG. 3 is a block diagram of the preferred embodiment of a threshold signal generator constructed in accordance with the present invention.

A decision circuit 53 including a novel threshold signal generator constructed in accordance with the present invention is illustrated in detail in FIG. 3. As discussed previously, the composite envelope signal produced by the summation amplifier 44 is fed to the inverting input terminal of the mark vs. space comparator 54. This signal is compared with the reference threshold signal, fed to the noninverting input terminal of the comparator 54, to produce an output signal indicative of the demodulated data. The comparator 54 includes a capacitor $C_1$ connected in a positive feedback path, thus providing AC hysteresis to insure fast switching action without biasing the threshold level.

The demodulated data output signal from the comparator 54 is fed to an input terminal of a transition detector 70. Each time the demodulated data makes a transition between high and low output levels, the transition detector 70 produces an output pulse which is very narrow compared to the baud rate of the incoming information signal. For example, the width of the pulse produced by the transition detector 70 can be 7.8 microseconds for a baud rate of 50 to 150 bits per second. Each output pulse from the transition detector 70 resets a timer 72. The timer 72 counts the elapsed time between the detection of successive transitions in the demodulated data signal. The timer 72 is connected to an FET switch 74 which is opened each time the timer is reset and remains open for a predetermined time period after reset of the timer 72.

The composite envelope signal is presented to the input terminals of a pair of sample and hold circuits 76, 78 by means of a voltage follower buffer 80 and a resistor $R_1$ when the FET switch 74 is open. A sample command decision circuit 82 controls the actuation of the sample and hold circuits 76, 78. The output pulses from the transition detector 70 are fed to the sample command decision circuit 82 by means of a delay circuit 84. The delay period provided by the delay circuit 84 is chosen so that a delayed output pulse occurs near the peak amplitude excursion of the composite envelope signal, and is determined by the output characteristics of the envelope detectors and any additional low pass filters which are present in the demodulator circuitry. For example, the delay between detection of a transition in the composite envelope signal and production of the delayed output pulse can be 2.0 milliseconds. Depending on the design of the delay circuit 84, the delayed output pulse may have a width which is different from the pulse width of the output signal of the transition detector. A second input terminal of the sample command decision circuit 82 is connected with the output terminal of the comparator 54 to receive the demodulated data signal.

Upon the detection of a mark tone signal, the comparator 54 produces a low level signal which is fed to the sample command decision circuit. A transition in the demodulated data signal from high to low level is detected in the transition detector 70 and indicated by an output pulse. This pulse is delayed in the delay circuit 84 by the predetermined delay period and presented to the sample command decision circuit. The simultaneous presence of both the low level signal from the comparator 54 and the delayed pulse from the delay circuit 84 causes the sample command decision circuit 82 to actuate the mark sample and hold circuit 76 to detect the amplitude of the high composite envelope signal for a predetermined sample period and store the detected value. Subsequent detection of a space tone signal, causing the production of a high level signal by the comparator 54, operates in the same manner to cause the sample command decision circuit 82 to actuate the space sample and hold circuit 78 to detect the value of the amplitude of the composite envelope signal and store the detected value.

The mark sample and hold circuit 76 produces an output signal $V_M$ which is approximately equal to the amplitude of the positive excursion of the composite envelope signal. Likewise, the space sample and hold circuit 78 produces an output signal which is approximately equal to the amplitude of the negative excursion of the composite signal. The output signals $V_M$ and $V_S$ are combined in a voltage divider comprised of two equal valued resistors $R_2$. The voltage divider produces an output signal which is equal to the average value of the values stored in the sample and hold circuits 76, 78. This average value is fed to the positive input terminal of the comparator 54 as the threshold voltage signal $V_T$.

A memory capacitor $C_2$ is connected to the voltage divider comprised of the resistors $R_2$ to store the value of the threshold voltage signal $V_T$ for a predetermined time period. The time constant $(R_2C_2/2)$ provided by the voltage divider and the storage capacitor $C_2$ is compatible with the expected fading rate of the mark and space tone signals in the composite envelope signal. For example, the time constant can be 15 milliseconds for 30 dB fades at a rate of one fade per second.

The sample and hold circuits 76, 78 isolate the memory capacitor $C_2$ from the composite envelope signal so that the capacitor will not leak off, and changes in the output signals of the sample and hold circuits are negligible over many baud periods, so that independence of the threshold level signal from the data content of the received signal is established. Furthermore, isolation of the memory capacitor $C_2$ eliminates the problem of time constant compromise inherent to prior art threshold generators.

If no transition in the demodulated data signal is detected by the transition detector 70 for a time period which is relatively long compared to a baud period, the threshold generator circuit no longer receives the information necessary to establish the value of the output signals $V_M$ and $V_S$ from the sample and hold circuits 76, 78. Under this condition, the statistically most probable value for the threshold signal $V_T$ is zero volts. When such a time period has elapsed, the timer 72 produces an output signal indicative of the absence of an information signal. For example, the time period between detection of the last transition in the demodulated data signal and production of the output signal by the timer can be in the range of 512 to 528 milliseconds.

The FET switch 74 is also connected to the input terminals of the sample and hold circuits 76, 78. The production of the output signal by the timer 72 causes the FET switch 74 to close.

The value of the resistor $R_1$ is chosen so that its resistance is low compared to the input impedance of the sample and hold circuits 76, 78, but high relative to the closed state of the FET switch 74. Closure of the FET switch 74 at the end of the time period determined by the timer 72 conducts the composite envelope signal to ground and causes a predetermined reference signal, i.e., zero volts, to be presented to the input terminals of the sample and hold circuits 76, 78. The buffer 80 serves to isolate the inverting input terminal of the comparator 54 from the FET switch 74, so that grounding of the input signals to the sample and hold circuits 76, 78 will not affect the information in the input signal to the comparator 54.

At the time the FET switch 74 is closed, the output signal from the timer 72 causes the sample command decision circuit 82 to continuously actuate both of the sample and hold circuits 76, 78 to be in the sample state. This forces the output signals $V_M$ and $V_S$ of the sample and hold circuits to go to zero volts, and consequently results in a threshold signal $V_T$ of zero volts. When the next transition of the demodulated data occurs, the switch 74 opens and the timer circuit 72 no longer forces the threshold signal to be zero volts. The switch 74 remains open as long as transitions continue to occur at a rate greater than the predetermined measurement period set by the timer 72, and the sample and hold circuits operate in the manner previously described to generate the threshold signal.

Figure 4:
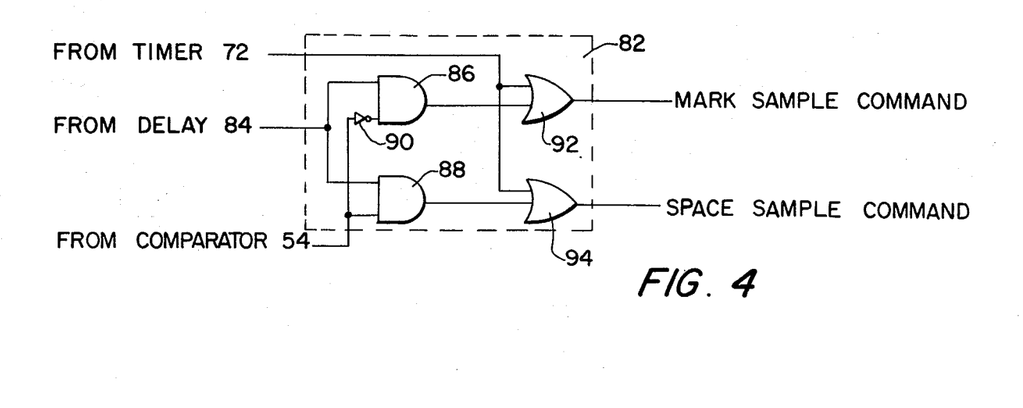
FIG. 4 is a logic diagram of a sample command decision circuit which can be utilized in the preferred embodiment of the present invention.

A logic circuit which can be utilized to perform the function of the sample command decision circuit is illustrated in FIG. 4. The logic circuit includes a pair of AND gates 86, 88, each having one input terminal connected to the delay circuit 84. The other input terminal of one of the AND gates 88 is connected directly to the output terminal of the comparator 54, and the other input terminal of the other AND gate 86 is connected to the output terminal of the comparator 54 through an inverter 90. The output terminals of the AND gates 86, 88 are respectively connected to one input terminal of a pair of OR gates 92, 94. The other terminal of each of the OR gates 92, 94 is connected to the timer 72. A low level signal from the comparator 54, indicative of the detection of a mark tone signal, combined with a delayed output pulse from the delay circuit 84, produced after detection of a transition in the demodulated data signal, causes the AND gate 86 to produce a high level output signal which is passed by the OR gate 92 to provide an actuating pulse to the mark sample and hold circuit 76. Likewise, the production of a high level output signal from the comparator 54 indicative of the detection of a space tone signal, simultaneously with the production of a delayed output pulse from the delay circuit 84, causes the AND gate 88 to produce an output signal which actuates the space sample and hold circuit 78. Production of the output signal by the timer 72 after the predetermined measurement period causes both of the OR gates 92, 94 to continuously produce actuating signals for the duration of the the output signal from the timer 72. These continuous actuation signals cause the sample and hold circuits 76, 78 to continually sample the grounded input signals at their respective input terminals and produced the desire threshold signal of zero volts.

SUMMARY OF THE ADVANTAGES AND SCOPE OF THE PRESENT INVENTION

It is apparent from the preceding description that the present invention provides numerous advantages with respect to prior art threshold generating devices, particularly those which are used in connection with frequency shift keyed data transmission.

For example, the various time constants which have a factor in the generation of the threshold voltage can be established independently of one another. The threshold generator can be set up to rapidly respond to selective fading of the FSK signal, since the response rate of the generator is independent of the decay rate of the stored value for the threshold signal. The decay rate of the RC circuit comprising the averaging unit can be precisely adjusted to the expected fading rate of the peak excursions in the composite envelope signal, since the memory capacitor is isolated from the incoming signal by the sample and hold circuits. The length of the reset period at the end of which the threshold signal is forced to zero volts can be established without compromising the other timing factors.

In addition, the threshold signal is rapidly forced to the statistically most probable threshold signal, i.e., zero volts, when no transition occurs in the composite envelope signal over a predetermined period of time. This forcing of the threshold signal to zero volts provides much more flexibility in establishing the length of the reset period than the prior art threshold generators in which the threshold signal is allowed to slowly drift to zero in accordance with the decay rate of a capacitive circuit.

Furthermore, the establishment and maintenance of the threshold voltage level takes place independently of the data content of the received FSK signal. The consecutive transmission of a series of tone signals of one type does not affect the threshold voltage level. The only factors which are considered in establishing the threshold level are the amplitude levels of the peak excursions in the composite envelope signal and the length of time which elapses after the last detected transition in the output data signal.

The present invention may be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes which come within the meaning and range of equivalency of the claims are therefore intended to be embraced therein.

What is claimed is:

1. Apparatus for generating a variable level threshold signal intermediate the amplitude level of first and second information signals in a composite signal having different amplitude levels, and, when at least one of said information signals is not received within a predetermined time period, for generating a threshold signal having the statistically most probable amplitude level independent of the data content of the composite signal, comprising:

means for detecting transitions in a composite signal between first and second amplitude levels;

first memory means for sampling and storing the amplitude level of said composite signal;

second memory means for sampling and storing the amplitude level of said composite signal;

control means for actuating said first memory means to sample and store the value of said first amplitude level responsive to the detection of a transition from said second amplitude level to said first amplitude level in said composite signal, and for actuating said second memory means to sample and store the value of said second amplitude level responsive to the detection of a transition from said first amplitude level of said second amplitude level in said composite signal;

means for detecting the time period between successive transitions in said composite signal and producing an output signal when a predetermined time period lapses between successive transitions to cause both the first and second memory means to store a signal of predetermined amplitude rather than the amplitude levels of the composite signal; and means for producing a threshold signal equal in amplitude to the average value of the values stored in said first and second memory means.

2. The apparatus of claim 1 wherein said control means is responsive to said output signal from said time period detecting means to actuate both said first and second memory means to continuously sample and store said predetermined amplitude signal.

3. The apparatus of claim 1 further including means for delaying actuation of said first and second memory means by said control means for a predetermined delay period after the detection of a transition in said composite signal.

4. The apparatus of claim 1 further including means responsive to said output signal for conducting said composite signal to ground to produce said predetermined amplitude signal.

5. A method for generating a variable level threshold signal intermediate the amplitude level of first and second information signals in a composite signal having different amplitude levels, and for generating a threshold signal having the statistically most probable amplitude level, independent of the data content of the composite signal, when at least one of said information signals is not received within a predetermined time period, comprising the steps of:

detecting transitions in a received information signal between first and second amplitude levels;

sampling and storing the value of said first amplitude level in response to a transition from said second to said first amplitude level in said received information signal;

sampling and storing the value of said second amplitude level in response to a transition from said first to said second amplitude level in said received information signal;

detecting the lapsed time between successive transitions in said received information signal;

replacing the stored values for said first and second amplitude levels with a predetermined amplitude value when the detected time lapse exceeds a predetermined time period; and producing a threshold level signal equal in amplitude to the average value of the stored values.

6. The method of claim 5 wherein the steps of sampling and storing take place a predetermined delay period after a transition is detected in the received information signal.

7. The method of claim 5 wherein said step of replacing includes grounding said received information signal to produce said predetermined amplitude value.

8. Apparatus for generating a reference signal dependent upon a parameter of at least two information signals, and for generating a predetermined reference signal in the absence of at least one of said information signals, comprising:

first storage means responsive to a first information signal for sampling and storing the value of a parameter of said first information signal;

second storage means responsive to a second information signal for sampling and storing the value of a parameter of said second information signal;

means for substituting a predetermined value for the information signal parameter values stored in said first and second storage means upon the absence of at least one of said first and second information signals for a predetermined time period; and means for combining the values stored in said first and second storage means to produce a reference signal.

9. The reference signal generating apparatus of claim 8 wherein said substituting means includes means for detecting said first and second information signals and means to apply said predetermined value to said first and second storage means responsive to the failure to detect one of said first and second information signals during said predetermined time period after the other of said information signals has been detected.

10. A method for generating a reference signal dependent upon a parameter of at least two information signals, and for generating a predetermined reference signal in the absence of at least one of said information signals, comprising:

detecting a first information signal;

sampling and storing the value of a parameter of the first information signal upon detection of said first information signal;

detecting a second information signal;

sampling and storing the value of a parameter of the second information signal upon detection of said second information signal;

detecting the time lapsed between detection of one of said first and second information signals and the subsequent detection of the other of said first and second information signals;

substituting a predetermined value for the stored information signal parameter values when said elapsed time exceeds a predetermined time limit; and combining the stored value to form a reference signal.

11. Apparatus for generating a reference signal in dependence upon the quality of a composite signal which varies between two amplitude levels, comprising:

means for detecting transitions in a composite signal between a first amplitude level and a second amplitude level;

first means for sampling said composite signal and storing the value thereof;

second means for sampling said composite signal and storing the value thereof;

means for actuating said first value sampling and storing means a predetermined time after the detection of a transition in said composite signal from said second amplitude level to said first amplitude level, and for actuating said second value sampling and storing means a predetermined time after the detection of a transition in said composite signal from said first amplitude level to said second amplitude level; and means for combining the values stored in said first and second storing means to form a reference signal.

12. A method for generating a reference signal in dependence upon the quality of a composite signal which varies between two amplitude levels, comprising the steps of:

detecting transitions in a composite signal between first and second amplitude levels;

sampling said composite signal for a predetermined time interval after a predetermined time after the detection of a transition from said second to said first amplitude level and storing the value of said first sample;

sampling said composite signal for a predetermined time interval after a predetermined time after the detection of a transition from said first to said second amplitude level and storing the value of said second sample; and combining the stored values to form a reference signal.

13. In a demodulator for converting a frequency-shift-keyed information signal into a binary voltage output signal, including means for forming a composite envelope signal based upon the content of said information signal and decision means for producing said output signal in response to the amplitude level of said composite envelope signal, a threshold reference generator for supplying a threshold level signal to said decision means which compensates for selective fading in the information signal and produces the most statistically probable threshold level signal independently of data content of the information signal, comprising:

means for detecting transitions in said output signal between first and second binary levels;

first sample and hold means for sampling and storing the amplitude level of said composite envelope signal;

second sample and hold means for sampling and storing the amplitude level of said composite envelope signal;

means for actuating said first sample and hold means when said transition detecting means detects a transition from said second to said first binary level and for actuating said second sample and hold means when said transition detecting means detects a transition from said first to said second binary level;

means for detecting the time period between successive detected transitions in said output signal;

switch means responsive to the detection of a predetermined time period by said time detecting means to conduct said composite envelope signal to ground;

means for causing said actuating means to actuate both said first and second sample and hold means continuously upon the detection of said predetermined time period by said time detecting means; and means for forming the average value of the values stored in said first and second sample and hold means and for feeding said average value to said decision means as a threshold signal.

14. The demodulator of claim 13 further including means for delaying actuation of said first and second sample and hold means by said actuating means for a predetermined delay period after the detection of a transition in said output signal.

15. The demodulator of claim 13 further including means for indicating the value of said threshold signal.

16. The demodulator of claim 13 further including means for forming a signal related to the minimum width of the pulses in said composite envelope signal over a predetermined time period, and means for comparing this signal with a predetermined reference signal to determine whether an information signal has been detected.

* * * * *